United States Patent [19]

West et al.

[11] 4,327,001

[45] Apr. 27, 1982

[54] LOW SMOKE POLYOLEFIN JACKET COMPOSITION FOR ELECTRICAL WIRE

[75] Inventors: Archie West, Greenville; Dhirajlal B. Radadia, Lincoln, both of R.I.

[73] Assignee: Gulf & Western Manufacturing Company

[21] Appl. No.: 165,145

[22] Filed: Jul. 1, 1980

[51] Int. Cl.$^3$ .............................................. C08L 91/00
[52] U.S. Cl. .................. 524/322; 428/378; 524/437; 524/456; 524/516; 524/530
[58] Field of Search .................. 260/23 H, 42.52; 428/378

[56] References Cited

U.S. PATENT DOCUMENTS

| | | | |
|---|---|---|---|
| 2,057,690 | 10/1936 | Moss | 173/264 |
| 2,888,424 | 5/1959 | Precopio et al. | 204/159.2 |
| 3,470,122 | 9/1969 | Ridgeway et al. | 260/42.52 |
| 3,936,572 | 2/1976 | MacKenzie et al. | 428/379 |
| 3,956,212 | 5/1976 | Sakaguchi et al. | 260/42.52 |
| 4,001,128 | 1/1977 | Penneck | 252/63.2 |
| 4,022,945 | 5/1977 | MacKenzie et al. | 428/389 |
| 4,085,249 | 4/1978 | Taniguchi et al. | 428/383 |
| 4,134,812 | 1/1979 | Sasaki et al. | 260/45.85 |
| 4,140,818 | 2/1979 | Dave | 427/117 |

*Primary Examiner*—Lewis T. Jacobs
*Attorney, Agent, or Firm*—Vincent J. Vasta, Jr.

[57] ABSTRACT

A cross-linked polyolefin jacketing and/or insulating composition for use on wire and cable having superior resistance to the propagation of flame, a low smoke emission level and low emission of toxic byproducts when subjected to heat or flame, as well as low moisture absorption characteristics and high resistance to weathering, oils and chemicals, which comprises a polyethylene-vinyl acetate copolymer, magnesium silicate, and alumina hydrate in major proportions, and, in minor proportions, carbon black, polymerized 1,2-dihydro 2,2,4-trimethyl quinoline, stearic acid, vinyl-tris ($\beta$-methoxethoxy)silane, triallyl cyanurate, and di-cumyl peroxide in anhydrous aluminum silicate.

8 Claims, No Drawings

LOW SMOKE POLYOLEFIN JACKET COMPOSITION FOR ELECTRICAL WIRE

This invention also relates to a novel jacketed and/or insulated wire or cable wherein the jacketing is comprised of a polyethylene-vinyl acetate copolymer, magnesium silicate, and alumina hydrate in major proportions, and, in minor proportions, carbon black, polymerized 1,2-dihydro 2,2,4 trimethyl quinoline, stearic acid, vinyl-tris ($\beta$-methoxethoxy)silane, triallyl cyanurate, and di-cumyl perioxide in anhydrous aluminum silicate.

BACKGROUND OF THE INVENTION

The use of various compositions employing blends of ethylene polymers and copolymers in admixture with various other modifying ingredients as insulating materials and/or coverings in electrical wire applications is well known in the art.

Typically, a suitable polymeric resin material may be modified via the addition of a variety of specific additives in order to enhance various characteristics of the basic polymeric material in such a way as to obtain a composition which exhibits such enhanced physical characteristics as may be thought to be important in a particular application in which the resultant material is to be utilized.

Cross-linked ethylene-containing polymeric compositions are generally known to exhibit good physical properties such as tensile strength and low dielectric losses. However, recent demands for superior jacketing and/or insulating compositions for use on wire and cable which may require a combination of superior resistance to the propagation of flame together with low levels of smoke and toxic byproduct emission when subjected to heat and flame while, at the same time, high tensile strengths and resistance to moisture, abrasion and weathering, as well as resistance to various chemicals and oils, have rendered the materials heretofore available in the art inadequate.

Representative of the state of the art's knowledge vis-a-vis various compositions which have been heretofore taught to be useful combinations as covering materials in various electrical applications are the following:

U.S. Pat. No. 4,001,128 to Penneck, which issued on Jan. 4, 1977, relates to a filler system for polymers which provides a high voltage insulation material which is resistant to tracking. Penneck discloses a combination of alumina trihydrate together with a chemically treated silica filler in combination with various polymeric materials as having improved tracking resistance in high voltage insulating applications. Ethylene-vinyl acetate copolymers are disclosed amongst those which may be modified utilizing the disclosed fillers. Such insulating materials may also be cross-linked.

U.S. Pat. No. 3,936,572 to MacKenzie, Jr. et al., which issued on Feb. 3, 1976, describes a curable composition which is especially adaptable for use as insulation for wire and cable, comprising an ethylene-containing polymeric member, a curing agent and a silicone fluid having a specific viscosity. Such materials may also include carbon black and a mineral filler.

U.S. Pat. No. 4,022,945 to MacKenzie, Jr. et al., which issued on May 10, 1977, discloses a fire retardant system for polymeric compositions comprising a combination of a halogen-containing hydrocarbon and an oxide of iron. The disclosed compositions may include ethylene-vinyl acetate copolymers in admixture with various modifiers in addition to the specific flame retardant agents disclosed as components of the insulation material.

U.S. Pat. No. 4,085,249 to Taniguchi et al., which issued on Apr. 18, 1978, teaches a semi-conductive composition having controlled strippability made from cross-linked ethylene polymer based insulation compositions, comprising chlorinated ethylene-vinyl acetate copolymer containing about 3 to 40 percent by weight of chlorine and conductive carbon black.

U.S. Pat. No. 4,140,818 to Dave, which issued on Feb. 20, 1979, relates to cured insulation compositions which are freely strippable from the encased conductors and incorporate the use of small amounts of (a) a dialkyl tin diester, (b) N,N'-ethylene bis-stearamide or similar waxy compositions, and (c) certain 3-amido-1,2,4-triazoles. The use of the combination of the foregoing materials in known insulation formulations is taught to render the resultant insulation freely strippable.

U.S. Pat. No. 2,888,424 to Precopio et al., which issued on May 26, 1959, discloses compositions comprising polyethylene and polyethylene blends, dicumyl peroxide and fillers selected from the group consisting of silica, carbon black, alumina and calcium silicate as well as the cured products thereof, to yield products having improved physical properties.

U.S. Pat. No. 4,134,812 to Sasaki et al., which issued on Jan. 16, 1979, relates to a method of manufacturing shaped articles of a cross-linked poly-$\alpha$-olefin composition via irradiation with an electron beam which includes the step of blending the poly-$\alpha$-olefin with a composition miscible therewith which composition may contain an acetylenic linkage.

U.S. Pat. No. 2,057,690 to Moss, which issued on Oct. 20, 1936, relates to the production of electrical devices utilizing plasticized polymerized vinyl acetate and other polymerized vinyl compounds to produce compositions having high electrical resistance suitable for insulating electrical conductors.

None of the foregoing prior art teachings suggest the particular compositions which are the subject of the present application which exhibit a unique combination of superior resistance to the propagation of flame along, with an extremely low level of smoke emission and a relatively low level of toxic byproduct emission when such compositions are subjected to heat or flame while, at the same time, exhibiting superior tensile strength and resistance to weathering, moisture and too many chemicals and oils.

It is, therefore, an object of the present invention to provide a cross-linked polyolefin composition for use as a jacketing material in high voltage wire and cable applications which jacketing composition possesses a superior resistance to the propagation of flame, a low smoke emission level and low emission of toxic byproduct when subjected to heat or flame as well as lower water absorption characteristics and high resistance to weathering, oils and chemicals.

It is a further object of the present invention to provide a cross-linked polyolefin insulating composition for use in low voltage wire and cable applications which insulating material possesses superior resistance to the propagation of flame, a low smoke emission level and low emission of toxic byproducts when subjected to heat or flame as well as low moisture, absorption characteristics and high resistance to weathering, oils and chemicals.

It is a further object of the present invention to provide for a novel jacketed wire or cable for high voltage applications wherein the jacketing is comprised of a polyethylenevinyl acetate copolymer, magnesium silicate and alumina hydrate in major proportions and, in minor proportions, carbon black, polymerized 1,2-dihydro 2,2,4 trimethyl quinoline, stearic acid, vinyl-tris (β-methoxethoxy)silane, triallyl cyanurate, and dicumyl peroxide in anhydrous aluminum silicate.

It is yet a further object of the present invention to provide for a novel insulated wire or cable for low voltage applications wherein the insulation is comprised of a polyethylenevinyl acetate copolymer, magnesium silicate and alumina hydrate in major proportions, and, in minor proportions, carbon black, polymerized 1,2-dihydro 2,2,4 trimethyl quinoline, stearic acid, vinyl tris (β-methoxethoxy)silane, triallyl cyanurate, and dicumyl peroxide in anhydrous aluminum silicate.

These and other objects of the present invention will become apparent from the following description of the invention.

SUMMARY OF THE INVENTION

In accordance with the present invention, a crosslinked polyolefin jacketing and/or insulating composition is provided for use on wire and cable having superior resistance to the propagation of flame, a low smoke emission level and low emission of toxic byproducts when subjected to heat or flame, as well as low moisture absorption characteristics and high resistance to weathering, oils and chemicals, which comprises a polyethylene-vinyl acetate copolymer, magnesium silicate, and alumina hydrate in major proportions, and, in minor proportions, carbon black, polymerized 1,2-dihydro 2,2,4 trimethyl quinoline, stearic acid, vinyl-tris (β-methoxethoxy)silane, triallyl cyanurate, and di-cumyl peroxide in anhydrous aluminum silicate.

This invention also provides for a novel jacketed and/or insulated wire or cable wherein the jacketing is comprised of a polyethylene-vinyl acetate copolymer, magnesium silicate, and alumina hydrate in major proportions and, in minor proportions, carbon black, polymerized 1,2-dihydro 2,2,4 trimethyl quinoline, stearic acid, vinyl tris (β-methoxethoxy)silane, triallyl cyanurate, and di-cumyl peroxide in anhydrous aluminum silicate.

DESCRIPTION OF THE PREFERRED EMBODIMENTS

It has been found that in order to achieve a significant reduction in the level of smoke and toxic byproduct emissions produced in jacketing and/or insulating compositions of the type described herein, it is necessary to modify the basic polymer composition using a unique combination of additives in a particular range of proportions so as to yield a resultant polymeric composition which exhibits a combination of superior resistance to the propagation of flame, low smoke emission level and low emission of toxic byproducts when subjected to heat or flame and, at the same time possesses low moisture absorption characteristics and high resistance to weathering, oils and chemicals and still have good mechanical properties such as tensile strength.

Specifically, it has been found that compositions having major proportions of a polyethylene-vinyl acetate copolymer, magnesium silicate and alumina hydrate together with minor proportions of carbon black, polymerized 1,2-dihydro 2,2,4 trimethyl quinoline, stearic acid, vinyl-tris(β-methoxethoxy)silane, triallyl cyanurate, and di-cumyl peroxide in anhydrous aluminum silicate, will exhibit the superior combination of properties sought.

A typical composition in accordance with the present invention will possess the specified materials in the following approximate proportions:

| COMPONENT | PHR |
|---|---|
| Polyethylene-Vinyl Acetate Copolymer | 100.0 |
| Magnesium Silicate | 30.0 |
| Alumina Hydrate | 150.0 |
| Carbon Black | 2.0 |
| Polymerized 1,2-Dihydro 2,2,4 Trimethyl Quinoline | 1.5 |
| Stearic Acid | 1.0 |
| Vinyl-Tris (β-Methoxyethoxy) Silane | 2.0 |
| Triallyl Cyanurate | 1.3 |
| Di-Cumyl Peroxide in Anhydrous Aluminum Silicate | 4.0 |
| | 291.8 |

The particular amounts of each component which must be present in order to obtain optimum characteristics in the resultant composition will vary somewhat depending upon the particular polyethylene-vinyl acetate copolymer employed.

The preferred polyethylene-vinyl acetate copolymer for use in the preparation of the compositions of the present invention is Vynathene EY-904, a commercially available material manufactured and sold by U.S. Industrial Chemicals Co., or the equivalent.

The preferred alumina hydrate for use in the compositions of the present invention is Hydral 710, a commercially available material manufactured and sold by ALCOA, or the equivalent.

The preferred carbon black for use in the compositions of the present invention is N-762 Black, a commercially available material manufactured and sold by the Phillips Petroleum Chemical Division, or the equivalent.

A preferred polymerized 1,2-dihydro 2,2,4 trimethyl quinoline is Agerite Resin MA, a commercially available material manufactured and sold by R. T. Vanderbilt Co., or the equivalent.

The stearic acid which is found to be useful in the present invention is a commercially available material manufactured and sold by a number of chemical companies and requires no further elaboration.

The preferred vinyl-tris (β-methoxethoxy)silane material for use in the composition of the present invention is Silane A-172, a commercially available material manufactured and sold by Union Carbide Corporation, or the equivalent.

The preferred triallyl cyanurate for use in the compostions of the present invention is TAC-75%, a commercially available material manufactured and sold by Kenrich Petrochemicals, Incorporated, or the equivalent.

The preferred di-cumyl peroxide in anhydrous aluminum silicate is Di-Cup 40KE, a commercially available material manufactured and sold by Hercules, Incorporated, or the equivalent.

The particular method of preparing the compositions and manufacturing the insulated or jacketed wire and/or cable which are the subject of the present invention is not critical and any of a number of commercially known techniques may be employed both for blending and extruding the modified polyethylene-vinyl acetate copolymer compositions and in forming the jacketed and/or insulated wire and/or cable.

The nature of the present invention may be more clearly understood by recourse to the following examples, which are set forth for illustrative purposes only and are not to be construed as limiting the invention thereto.

EXAMPLES I–XII

A number of compositions prepared from various combinations of polymeric material and various additives were blended and cured, and test samples prepared from each in order to evaluate the physical characteristics of the resultant copolymer composition. The specific components and proportions of each used for each composition are set forth in the attached Table 1, along with the physical properties of the resultant cured material.

TABLE 1
EXAMPLES I–XII

| COMPOSITION | I | II | III | IV | V | VI |
|---|---|---|---|---|---|---|
| HYPALON 40[1] | 100.0 | 100.0 | — | — | — | — |
| VYNATHENE EY-904[2] | — | — | 100.0 | — | 100.0 | 100.0 |
| VAMAC N-123[3] | — | — | — | 100.0 | — | — |
| MISTRON VAPOR | — | — | — | — | — | 30.0 |
| HYDRAL-710 | 200.0 | 200.0 | 150.0 | 150.0 | 150.0 | 120.0 |
| TOF | 50.0 | 36.0 | — | — | — | — |
| LITHARGE 90% | 17.0 | 17.0 | — | — | — | — |
| KOSMOS-20 BLACK | — | — | — | — | — | — |
| TETRONE A[4] | 3.0 | — | — | — | — | — |
| METHYL TUADS[5] | — | 2.0 | — | — | — | — |
| SULFUR[6] | — | 1.0 | — | — | — | — |
| AGERITE RESIN MA[7] | — | — | 0.5 | — | 0.5 | 0.5 |
| TAC-75%[8] | — | — | 1.3 | — | 1.3 | 1.3 |
| SANTOWHITE POWDER[9] | — | — | — | 2.0 | — | — |
| HVA-2[10] | — | — | — | 2.0 | — | — |
| ARMEEN 18D[11] | — | — | — | 0.5 | — | — |
| STEARIC ACID | — | — | 0.5 | 0.5 | 0.5 | 1.0 |
| DI-CUP 40 KE[12] | — | — | 3.5 | 7.0 | 7.0 | 3.5 |
| SILANE A-172 | — | — | — | — | — | — |
| VUL-CUP 40 KE | — | — | — | — | — | — |
| TOTAL (PHR) | 370.0 | 356.0 | 255.8 | 262.0 | 259.3 | 256.3 |
| TENSILE, PSI | 1033 | 991 | 862 | 1257 | 732 | 979 |
| ELONGATION, % | 575 | 535 | 258 | 250 | 200 | 358 |
| MODULUS at 200%, PSI | 355 | 441 | 862 | 1257 | 732 | 673 |
| CURED AT | 325° F./20′ | 325° F./20′ | 350° F./30′ | 350° F./38′ | 350° F./38′ | 350° F./20′ |

| COMPOSITION | VII | VIII | IX | X | XI | XII |
|---|---|---|---|---|---|---|
| HYPALON 40[1] | — | — | — | — | — | — |
| VYANTHENE EY-904[2] | 100.0 | 100.0 | 100.0 | 100.0 | 100.0 | 100.0 |
| VAMAC N-123[3] | — | — | — | — | — | — |
| MISTRON VAPOR | — | 30.0 | 30.0 | — | 30.0 | 30.0 |
| HYDRAL-710 | 100.0 | 150.0 | 150.0 | 150.0 | 150.0 | 150.0 |
| TOF | — | — | — | — | 6.0 | 6.0 |
| LITHARGE 90% | — | — | — | — | — | — |
| KOSMOS-20 BLACK | — | — | 2.0 | 2.0 | 2.0 | 2.0 |
| TETRONE A[4] | — | — | — | — | — | — |
| METHYL TUADS[5] | — | — | — | — | — | — |
| SULFUR[6] | — | — | — | — | — | — |
| AGERITE RESIN MA[7] | 0.5 | 1.5 | 1.5 | 0.5 | 1.5 | 1.5 |
| TAC-75%[8] | 1.3 | 1.3 | 1.3 | 1.3 | 1.3 | 1.3 |
| SANTOWHITE POWDER[9] | — | — | — | — | — | — |
| HVA-2[10] | — | — | — | — | — | — |
| ARMEEN 18D[11] | — | — | — | — | — | — |
| STEARIC ACID | 1.0 | 1.0 | 1.0 | 0.5 | 1.0 | 1.0 |
| DI-CUP 40 KE[12] | 3.5 | 4.0 | 4.0 | 3.5 | 4.0 | — |
| SILANE A-172 | — | 2.0 | 2.0 | — | 2.0 | 2.0 |
| VUL-CUP 40 KE | — | — | — | — | — | 2.5 |
| TOTAL (PHR) | 206.3 | 289.8 | 291.8 | 257.8 | 297.8 | 297.8 |
| TENSILE, PSI | 885 | 1716 | 2063 | 861 | 1331 | 1380 |
| ELONGATION, % | 375 | 165 | 150 | 400 | 200 | 175 |
| MODULUS at 200%, PSI | 368 | — | — | 512 | 1331 | — |
| CURED AT | 350° F./ | 350° F./ | 350° F./ | 350° F./ | 350° F./ | 350° F./ |

TABLE 1-continued

| EXAMPLES I-XII | | | | | |
|---|---|---|---|---|---|
| 20' | 20' | 20' | 20' | 20' | 20' |

Footnotes:
[1] du Pont;
[2] VAE U.S. Ind. Chem.;
[3] Ethylene/Acrylic-du Pont;
[4] Accelerator-du Pont;
[5] Ultra Accelerator RTV;
[6] Vulcanizer;
[7] Antioxidant RTV;
[8] Accelerator;
[9] Antioxidant;
[10] Accelerator for Hypalon du Pont;
[11] ARMAK;
[12] Vulcanizer

EXAMPLE XIII

Various samples of a material having the same composition as Example IX were prepared, cured and evaluated in accordance with a number of test methods as set forth in attached Table 2. Typical test values as determined by the individual test method indicated are set forth for each of the properties evaluated.

TABLE 2

| EXAMPLE XIII | | |
|---|---|---|
| | Test Method | Value |
| Unaged physical properties: | | |
| Tensile strength, Min. PSI | ASTM D-412 | 2,000 |
| Elongation, % | ASTM D-412 | 160 |
| Tear strength, PSI | ASTM D-470 | 20 |
| Hardness (Durometer), Shore "A" | ASTM D-2240 | 90 |
| Physical properties after aging: | | |
| Air oven-7 days (168 hrs.) at 100° C. | ASTM D-573 | — |
| Tensile, % retained | — | 105 |
| Elongation, % retained | — | 105 |
| Air oven-7 days (168 hrs.) at 121° C. | ASTM D-573 | — |
| Tensile, % retained | — | 105 |
| Elongation, % retained | — | 105 |
| Air oven-7 days (168 hrs.) at 150° C. | ASTM D-573 | — |
| Tensile, % retained | — | 110 |
| Elongation, % retained | — | 95 |
| Oil immersion-18 hrs. at 121° C. in ASTM #2 oil | ASTM D-741 | — |
| Tensile, % retained | — | 85 |
| Elongation, % retained | — | 85 |
| Gravimetric water absorption-168 hrs. in 70° C. water, mg/in$^2$ | ASTM D-470 | 17 |
| Cold bend - 1 hr. at −40° C. | ICEA S-19-81 | Pass |
| Oxygen Index | ASTM D-2863 | 32 |
| Ozone Resistance-24 hrs. at .030% | ICEA S-19-81 | No Cracks |
| Surface Resistivity, Megohms | ICEA S-19-81 | 7.86 × 10$^6$ |
| Heat of combustion, BTU/Lb. | ASTM D-240 | 6,000 |
| Smoke density | ASTM D-2843 | 2.8 |
| Smoke generation | NFPA 258T | — |
| Flaming avg., 4 minutes | — | 13 |
| Flaming avg., max. | — | 132 |
| Nonflaming avg., 4 minutes | — | 9 |
| Nonflaming avg., max. | — | 189 |
| Copper mirror corrosion | ASTM D-2671 | — |
| 16 hrs. at 150° C., % copper removed | — | 8 |
| 16 hrs. at 175°0 C., % copper removed | — | 15 |
| Acid gas generation (HCl), PPM/mg | Mine Safety Pump | 0 |

Although the above examples illustrate various modifications of the present invention, other variations will suggest themselves to those skilled in the art in the light of the above disclosure. It is to be understood, therefore, that changes may be made in the particular embodiments described above which are within the full intended scope of the invention as defined in the appended claims.

We claim:

1. A cross-linked polyolefin jacketing composition for use on wire and cable having superior resistance to the propagation of flame, a low smoke emission level and low emission of toxic byproducts when subjected to heat or flame, as well as low moisture absorption characteristics and high resistance to weathering, oils and chemicals, which consists essentially of a polyethylene-vinyl acetate copolymer, magnesium silicate, and alumina hydrate in major proportions, and, in minor proportions, carbon black, polymerized 1,2-dihydro 2,2,4 trimethyl quinoline, stearic acid, vinyl-tris (β-methoxethoxy)silane, triallyl cyanurate, and di-cumyl peroxide in anhydrous aluminum silicate.

2. A cross-linked polyolefin jacketing composition for use on wire and cable according to claim 1 which consists essentially of about 100 phr of a polyethylene-vinyl acetate copolymer, about 30 phr magnesium silicate and about 150 phr alumina hydrate, in combination with about 2 phr carbon black, about 1.5 phr polymerized 1,2-dihydro 2,2,4 trimethyl quinoline, about 1.0 phr stearic acid, about 2.0 phr vinyl-tris (β-methoxethoxy)silane, about 1.3 phr triallyl cyanurate and 4.0 phr di-cumyl peroxide in anhydrous aluminum silicate.

3. A jacketed wire or cable wherein the jacketing consists essentially of of a polyethylene-vinyl acetate copolymer, magnesium silicate, and alumina hydrate in major proportions, and, in minor proportions, carbon black, polymerixed 1,2-dihydro 2,2,4 trimethyl quinoline, stearic acid, vinyl-tris (β-methoxethoxy)silane, triallyl cyanurate, and di-cumyl peroxide in anhydrous aluminum silicate.

4. A jacketed wire or cable according to claim 3 wherein the jacketing consists essentially of of about 100 phr of a polyethylene-vinyl acetate copolymer, about 30 phr magnesium silicate and about 150 phr alumina hydrate, in combination with about 2 phr carbon black, about 1.5 phr polymerized 1,2-dihydro 2,2,4 trimethyl quinoline, about 1.0 phr stearic acid, about 2.0 phr vinyl-tris (β-methoxethoxy)silane, about 1.3 phr triallyl cyanurate and 4.0 phr di-cumyl peroxide in anhydrous aluminum silicate.

5. A cross-linked polyolefin insulating composition for use on wire and cable having superior resistance to the propagation of flame, a low smoke emission level and low emission of toxic byproducts when subjected to heat or flame, as well as low moisture absorption characteristics and high resistance to weathering, oils and chemicals, which consists essentially of a polyethylene-vinyl acetate copolymer, magnesium silicate, and alumina hydrate in major proportions, and, in minor proportions, carbon black, polymerized 1,2-dihydro 2,2,4 trimethyl quinoline, stearic acid, vinyl-tris (β-methoxethoxy)silane, triallyl cyanurate, and di-cumyl peroxide in anhydrous aluminum silicate.

6. A cross-linked polyolefin insulating composition for use on wire and cable according to claim 5 which consists essentially of about 100 phr of a polyethylene-vinyl acetate copolymer, about 30 phr magnesium silicate and about 150 phr alumina hydrate, in combination with about 2 phr carbon black, about 1.5 phr polymerized 1,2-dihydro 2,2,4 trimethyl quinoline, about 1.0 phr stearic acid, about 2.0 phr vinyl-tris (β-methoxethoxy)silane, about 1.3 phr triallyl cyanurate and 4.0 phr di-cumyl peroxide in anhydrous aluminum silicate.

7. An insulated wire or cable wherein the insulation consists essentially of of polyethylene-vinyl acetate copolymer, magnesium silicate, and alumina hydrate in major proportions, and, in minor proportions, carbon black, polymerized 1,2-dihydro 2,2,4 trimethyl quinoline, stearic acid, vinyl tris (β-methoxethoxy)silane, triallyl cyanurate, and di-cumyl peroxide in anhydrous aluminum silicate.

8. An insulated wire or cable according to claim 7 where in the insulation consists essentially of of about 100 phr of a polyethylene-vinyl acetate copolymer, about 30 phr magnesium silicate and about 150 phr alumina hydrate, in combination with about 2 phr carbon black, about 1.5 phr polymerized 1,2-dihydro 2,2,4 trimethyl quinoline, about 1.0 phr stearic acid, about 2.0 phr vinyl-tris (β-methoxethoxy)silane, about 1.3 phr triallyl cyanurate and 4.0 phr di-cumyl peroxide in anhydrous aluminum silicate.

* * * * *

UNITED STATES PATENT AND TRADEMARK OFFICE
CERTIFICATE OF CORRECTION

PATENT NO. : 4,327,001
DATED : April 27, 1982
INVENTOR(S) : ARCHIE WEST and DHIRAJLAL B. RADADIA It is certified that error appears in the above—identified patent and that said Letters Patent is hereby corrected as shown below:

Column 1, line 12, "perioxide" should read -- peroxide --.

Column 7, line 58, in Table 2, "16 hrs. at 175°0C.," should read -- 16 hrs. at 175°C., --.

Signed and Sealed this

Twenty-first Day of September 1982

|SEAL|

Attest:

GERALD J. MOSSINGHOFF

Attesting Officer     Commissioner of Patents and Trademarks